United States Patent
Cai (10) Patent No.: US 8,713,759 B2
(45) Date of Patent: May 6, 2014

(54) HINGE APPARATUS AND ELECTRONIC DEVICE COMPRISING IT

(71) Applicant: Lenovo (Beijing) Co., Ltd., Beijing (CN)

(72) Inventor: Xiao Cai, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 0 days.

(21) Appl. No.: 13/775,690

(22) Filed: Feb. 25, 2013

(65) Prior Publication Data

US 2013/0219663 A1 Aug. 29, 2013

(30) Foreign Application Priority Data

Feb. 27, 2012 (CN) .......................... 2012 1 0046879

(51) Int. Cl.
*E05D 3/06* (2006.01)
*E05D 3/00* (2006.01)
*E05D 7/00* (2006.01)

(52) U.S. Cl.
USPC ............. 16/366; 16/368; 16/369; 361/679.27

(58) Field of Classification Search
USPC .......... 16/366, 368, 369; 361/679.27, 679.04, 361/679.06, 679.07, 679.1, 679.18–679.2, 361/679.28; 455/90.3; 379/433.11, 433.13
See application file for complete search history.

(56) References Cited

U.S. PATENT DOCUMENTS

| | | | | |
|---|---|---|---|---|
| 368,539 A | * | 3/1887 | Ludlow | 16/366 |
| 1,352,312 A | * | 9/1920 | Pines | 198/822 |
| 1,984,092 A | * | 12/1934 | Soss | 16/369 |
| 2,013,915 A | * | 9/1935 | Hughes | 16/369 |
| 2,200,142 A | * | 5/1940 | Witschi | 16/369 |
| 2,721,353 A | * | 10/1955 | Mackintosh | 16/294 |
| 2,820,669 A | * | 1/1958 | Lowe | 296/97.6 |
| 3,219,398 A | * | 11/1965 | Anderson | 384/44 |
| 4,063,585 A | * | 12/1977 | Stanley | 160/135 |
| 4,266,650 A | * | 5/1981 | Patel et al. | 193/35 TE |
| 4,393,542 A | * | 7/1983 | Martinez | 16/369 |
| 4,610,560 A | * | 9/1986 | Miller | 403/119 |
| 4,825,395 A | * | 4/1989 | Kinser et al. | 361/679.09 |
| 4,834,329 A | * | 5/1989 | Delapp | 248/183.3 |
| 4,854,010 A | * | 8/1989 | Maraghe et al. | 16/360 |
| 4,858,488 A | * | 8/1989 | Butts | 74/519 |
| 5,450,655 A | * | 9/1995 | Ferrari et al. | 16/370 |
| 5,493,880 A | * | 2/1996 | Jang | 70/202 |
| 5,503,497 A | * | 4/1996 | Dudley et al. | 403/103 |
| 5,805,535 A | * | 9/1998 | Guyard et al. | 368/283 |
| 6,223,393 B1 | * | 5/2001 | Knopf | 16/366 |
| 6,968,056 B2 | * | 11/2005 | Barnett et al. | 379/433.13 |

(Continued)

FOREIGN PATENT DOCUMENTS

| | | | | |
|---|---|---|---|---|
| CN | 201461859 U | * | 5/2010 | F16G 13/12 |
| WO | WO 8707051 A1 | * | 11/1987 | G05G 1/04 |

*Primary Examiner* — Victor Batson
*Assistant Examiner* — Jason W San
(74) *Attorney, Agent, or Firm* — Brinks Gilson & Lione; G. Peter Nichols (57) ABSTRACT

An electronic device that includes a hinge apparatus and the hinge apparatus are described. The hinge apparatus includes n shafts, arranged side by side, wherein n is an integer equal to or greater than 3; and multiple connecting elements for rotatably connecting each two adjacent shafts so as to form a shaft chain. The hinge apparatus can achieve a flexible shaft effect and can place the two portions connected by it in the same plane.

9 Claims, 4 Drawing Sheets

(56) References Cited

U.S. PATENT DOCUMENTS

| | | | |
|---|---|---|---|
| 7,056,246 B2 * | 6/2006 | Foster et al. | 474/140 |
| 7,072,699 B2 * | 7/2006 | Eiden | 455/575.8 |
| 7,082,196 B2 * | 7/2006 | Kauhaniemi et al. | 379/447 |
| 7,140,074 B2 * | 11/2006 | Han et al. | 16/366 |
| 7,200,224 B2 * | 4/2007 | Park et al. | 379/433.13 |
| 7,251,323 B2 * | 7/2007 | Holtorf et al. | 379/433.13 |
| 7,414,834 B2 * | 8/2008 | Ukonaho et al. | 361/679.55 |
| 7,509,142 B2 * | 3/2009 | Ditzik | 455/557 |
| 7,515,707 B2 * | 4/2009 | Ka et al. | 379/433.12 |
| 7,532,916 B2 * | 5/2009 | Lee et al. | 455/575.4 |
| 7,540,391 B2 * | 6/2009 | Kato | 220/252 |
| 7,587,225 B2 * | 9/2009 | Kim et al. | 455/575.1 |
| 7,667,959 B2 * | 2/2010 | Pelkonen | 361/679.27 |
| 7,805,810 B2 * | 10/2010 | Hoffman | 16/354 |
| 8,014,134 B2 * | 9/2011 | Liu et al. | 361/679.01 |
| 8,104,144 B2 * | 1/2012 | Wang et al. | 16/354 |
| 8,125,759 B2 * | 2/2012 | Fukuma et al. | 361/260 |
| 8,152,402 B2 * | 4/2012 | Wylde et al. | 403/54 |
| 8,205,305 B2 * | 6/2012 | Wang et al. | 16/354 |
| 8,243,459 B2 * | 8/2012 | Hoshino | 361/755 |
| 8,310,844 B2 * | 11/2012 | Hashimoto et al. | 361/826 |
| 8,320,123 B2 * | 11/2012 | Chen | 361/679.59 |
| D671,948 S * | 12/2012 | Akana et al. | D14/440 |
| 8,336,286 B2 * | 12/2012 | Veltrop et al. | 59/78 |
| 8,339,777 B2 * | 12/2012 | Ling | 361/679.27 |
| 2004/0266496 A1 * | 12/2004 | Kauhaniemi et al. | 455/575.1 |
| 2008/0109995 A1 * | 5/2008 | Kuwajima et al. | 16/354 |
| 2008/0196842 A1 * | 8/2008 | Schoeren | 160/133 |
| 2009/0008615 A1 * | 1/2009 | Young et al. | 254/133 R |
| 2009/0070961 A1 * | 3/2009 | Chung et al. | 16/354 |
| 2009/0133316 A1 * | 5/2009 | Richter | 43/54.1 |
| 2010/0232100 A1 * | 9/2010 | Fukuma et al. | 361/679.01 |
| 2011/0000136 A1 * | 1/2011 | Brun | 49/358 |
| 2011/0255221 A1 * | 10/2011 | Ling | 361/679.01 |
| 2011/0255727 A1 * | 10/2011 | Azuchi | 381/333 |
| 2011/0265288 A1 * | 11/2011 | Chiang | 16/341 |
| 2012/0047685 A1 * | 3/2012 | Ma et al. | 16/319 |
| 2012/0120618 A1 * | 5/2012 | Bohn | 361/749 |
| 2012/0147542 A1 * | 6/2012 | Kim | 361/679.28 |
| 2013/0016492 A1 * | 1/2013 | Wang et al. | 361/820 |
| 2013/0135809 A1 * | 5/2013 | Uchiyama et al. | 361/679.09 |

* cited by examiner

HINGE APPARATUS AND ELECTRONIC DEVICE COMPRISING IT

This application claims priority to Chinese patent application No. CN 201210046879.4 filed on Feb. 27, 2012, the entire contents of which is incorporated herein by reference.

The present invention generally relates to a hinge apparatus, and more particularly to a hinge apparatus with a flexible shaft effect and an electronic device comprising the hinge apparatus.

BACKGROUND

Portable electronic devices, such as notebook computers, mobile phones, personal digital assistants (PDA) and digital media players and so on have been widely used in people's daily lives. Therefore, users also have increasing demands on such electronic devices. Many users hope that portable electronic devices are waterproof and dustproof and are adapt to the needs of a variety of environments. The processor of the electronic device can have no cooling hole after advancing into the low power era. However, the hinge connecting portion of the electronic device still cannot be seamless.

On the other hand, users have multiple usage requirements, requiring electronic products, such as notebook computers, to provide a 360-degree rotation and stay in any position to achieve a variety of usage patterns. However, the hinge apparatus in the prior art cannot make the screen portion and the keyboard portion of the notebook computers, for example, in the same plane.

Therefore, there is a need for a hinge apparatus, which can solve one or more of the above-mentioned problems or other problems in the prior art

SUMMARY

According to one aspect of the present invention, a hinge apparatus is provided, which can achieve a flexible shaft effect.

According to another aspect of the present invention a hinge apparatus is provided, which can achieve a seamless connection between two portions.

According to still another aspect of the present invention a hinge apparatus is provided, which can place the two portions connected by it in the same plane.

According to yet another aspect of the present invention a hinge apparatus is provided, which comprises any one of the foregoing hinge apparatuses.

According to one exemplary embodiment of the present invention, a hinge apparatus is provided, comprising: n shafts, arranged side by side, wherein n is an integer equal to or greater than 3; and multiple connecting elements, for rotatably connecting each two adjacent shafts so as to form a shaft chain.

Each connecting element can have two shaft holes and each two adjacent shafts can be nested into the two shaft holes respectively.

Each two adjacent shafts can be rotatably connected to each other through the connecting element at both ends of the shafts.

The hinge apparatus can comprise two or more shaft chains and the hinge apparatus can further comprise: at least one synchronization bridge, each of the synchronization bridge extending along the direction in parallel with the shaft and connecting the two shafts which are in adjacent two shaft chains respectively, so as to synchronize the rotation of the two shafts.

The shaft can provide a projection and the connecting element can provide a baffler, and the projection and the baffler can cooperate to limit the maximum rotation angle of the shaft with respect to the connecting element to a predetermined angle. The predetermined angle can be $180/(n-1)$ degrees.

The hinge apparatus can further comprise a fixed connecting element, provided on the two outermost shafts of the shaft chain to fixedly connect to external parts to be connected by the hinge.

The hinge apparatus can further comprise a soft covering material to cover the shaft chain.

According to another exemplary embodiment, an electronic device can comprise a first body, a second body, and a hinge apparatus connecting the first body and the second body, the hinge apparatus comprising: n shafts, arranged side by side, wherein n is an integer equal to or greater than 3; multiple connecting elements, for rotatably connecting each two adjacent shafts so as to form a shaft chain.

Each connecting element can have two shaft holes and each two adjacent shafts are nested into the two shaft holes respectively.

Each two adjacent shafts can be rotatably connected to each other through the connecting element at both ends of the shafts.

The hinge apparatus can comprise two shaft chains and the hinge apparatus can further comprise: at least one synchronization bridge, each of the synchronization bridge extending along the direction in parallel with the shaft and connecting the two shafts which are in adjacent two shaft chains respectively, so as to synchronize the rotation of the two shafts.

The shaft can provide a projection and the connecting element can provide a baffler, and the projection and the baffler can cooperate to limit the maximum rotation angle of the shaft with respect to the connecting element to a predetermined angle. The predetermined angle can be $180/(n-1)$ degrees. The baffler can be symmetrical with respect to the line of the center of the two shaft holes.

The hinge apparatus can further comprise: a fixed connecting element, provided on the two outermost shafts of the shaft chain to fixedly connect to the first body and the second body respectively.

The hinge apparatus can further comprise: a soft covering material, to cover the shaft chain and the connection between the shaft chain and the first body or the second body, so as to form a seamless connection.

The hinge apparatus of the present invention achieves a flexible shaft effect by connecting multiple shafts to form shaft chains, and the hinge apparatus can also place the two bodies connected by it in the same plane to implement a seamless connection between the two bodies.

BRIEF DESCRIPTION OF THE DRAWINGS

The above and other aspects of an embodiment of the present invention become apparent from below with reference to the detailed description of the drawings, in the drawings.

DETAILED DESCRIPTION

Exemplary embodiment of the present invention will now be described with reference to the drawings, in which examples of exemplary embodiments are shown. However, the present invention can be embodied in many different forms and should not be construed to be limited to the embodiments illustrated herein. Instead, these embodiments are provided so that this disclosure will be thorough and complete, and will fully convey the scope of the present invention to those skilled in the art. In the drawings, for clarity, the sizes and relative sizes of the elements can be exaggerated, and the drawings are not necessarily drawn to scale.

Figure 1:
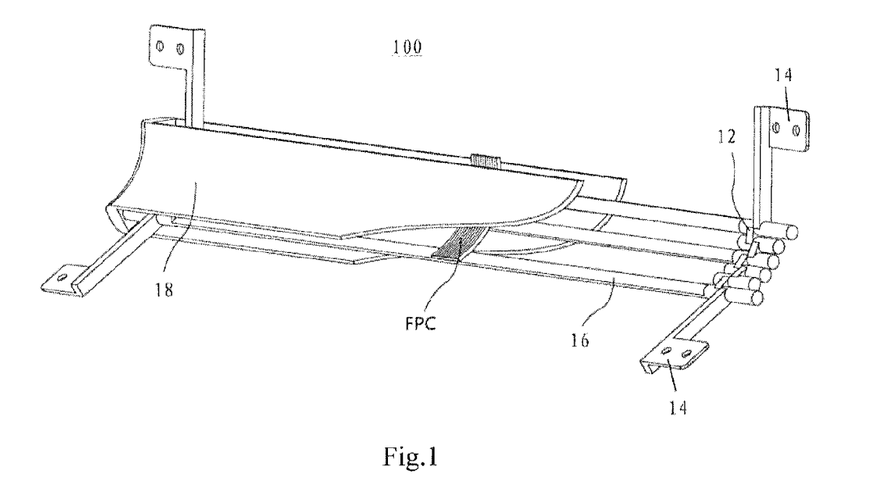
FIG. 1 shows a hinge apparatus according to an exemplary embodiment of the present invention.
Figure 2:
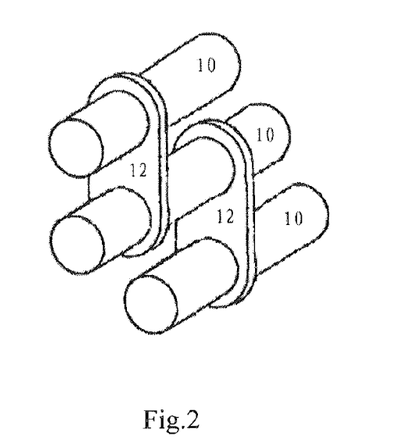
FIG. 2 is an enlarged view showing the mutual connection between the shafts of the hinge apparatus.

FIG. 1 shows a hinge apparatus 100 according to an exemplary embodiment of the present invention; FIG. 2 is an enlarged view showing the mutual connection among the shafts of the hinge apparatus 100.

As shown in FIG. 1, the hinge apparatus 100 can comprise multiple shafts 10. The multiple shafts 10 are arranged side by side in parallel with each other, and each two adjacent shafts 10 are connected to each other through a connecting element 12, so that the multiple shafts 10 form a shaft chain altogether. As an example, FIG. 1 shows six shafts 10. However, those skilled in the art can understand that the number of the shafts 10 is not limited thereto. A shaft chain can comprise more shafts 10, for example, 10, 12, or more, and it can also comprise fewer shafts 10, for example, three, four or five. However, in order to form the shaft chain so as to achieve the effect of a flexible shaft, the number of shafts 10 is more than three. Preferably, the number of shafts 10 included in a shaft chain is six or more to achieve a good flexible shaft effect.

Referring to FIG. 2, each connecting element 12 connects two adjacent shafts 10 to each other. The connecting element 12 can have two shaft holes, and adjacent two shafts 10 are nested into the two shaft holes of the connecting element 12 respectively. A certain friction can be provided between the connecting element 12 and shafts 10, thereby providing the torque required by the hinge.

FIG. 2 shows an example wherein two adjacent shafts 10 are connected to each other through only one connecting element 12. In other embodiments, the two adjacent shafts 10 can also be connected to each other through two or more connecting elements 12.

Referring back to FIG. 1, a fixed connecting element 14 can be provided for each of the two outermost shafts 10 respectively, to connect the two portions (for example, the display portion and the keyboard portion of an electronic device, such as a notebook computer and a mobile phone) to be connected by the hinge chain.

If used in a narrower device, the hinge apparatus 100 can include only one shaft chain; if used in a wide device, the hinge apparatus 100 can include two or more shaft chains. FIG. 1 shows a hinge apparatus 100 comprising two side-by-side arranged shaft chains. Preferably, the numbers of shafts 10 included in the two shaft chains are equal to each other. Two or more shaft chains help to improve the stability of the connection.

When the hinge apparatus 100 comprises two or more shaft chains, a synchronization bridge chain can also be provided between the shafts optionally, so that rotations of the shaft chains can be synchronized. As shown in FIG. 1, three synchronization bridges 16 can be provided between adjacent shaft chains, connecting the corresponding shafts of the adjacent shaft chains. Thus, the rotations of the corresponding shafts of the adjacent shaft chains can be synchronized with each other. FIG. 1 shows three synchronization bridges 16, but it can be understood that a synchronization bridge can be set to connect each shaft in the shaft chain at most.

Alternatively, the hinge apparatus 100 can also comprise a covering element 18. The covering element 18 can be made of flexible materials, such as rubber, leather and so on. The covering element 18 can cover the shaft chain formed by the shafts 10, the synchronization bridge 16 connecting the shaft chains and a flexible printed circuit ("FPC") for transmitting data or providing electricity between the two portions connected by the hinge apparatus 100. The edge of the covering element 18 can be hermetically connected to the portions connected by the hinge apparatus 100, thereby achieving seamless connections between the portions, thereby being able to be waterproof and dustproof.

Figure 3:
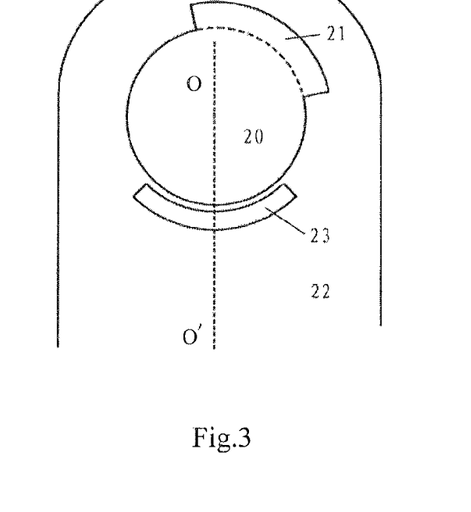
FIG. 3 is an enlarged view showing the connection between the shaft and the connecting element in a hinge apparatus according to another embodiment.

The hinge apparatus according to another embodiment of the present invention will be described below. The hinge apparatus can be substantially the same with the embodiment shown in FIG. 1 except the connection between the same shafts in the shaft chain. Therefore, the following description will focus on the difference and the repeated description of the same parts will be omitted. It should be understood that except the difference described below, the description of the embodiment of FIG. 1 can also be applied to the hinge apparatus according to the present embodiment. FIG. 3 is an enlarged view showing the connection between the shaft 20 and the connecting element 22 in the hinge apparatus according to the present embodiment.

As shown in FIG. 3, the connecting element 22 provides a baffler 23 around the shaft holes, and shaft 20 can also provide a projection 21 on its outer circumferential surface. The baffler 23 can block the rotation of the projection 21, thereby limiting the rotation angle of the shaft 20 with respect to the connecting element 22. It can be understood that by limiting the rotation angle of each shaft 20 with respect to the connecting element 22, the case where the rotation angle of some shafts is too large whereas the other shafts almost do not rotate can be prevented, so as to achieve the even rotation of each shaft, so that the shaft chain can bends smoothly. In order to make the hinge achieve a 360-degree rotation, the average rotation angle of each shaft with respect to the connecting element 22 is not less than $180/(n-1)$ degrees; if a 180 degree rotation is to be achieved, the average rotation angle of each shaft 20 with respect to the connecting element 22 is not less than $90/(n-1)$, wherein, n is the number of shafts 20 included in the shaft chain and n is more than or equal to three. Of course, the rotation angle of each shaft 20 with respect to the connecting element 22 can be set different so as to achieve the desired bending state of the shaft chain. For example, from both sides of the shaft chain towards the middle of the shaft chain, the rotation angle of the shaft 20 with respect to the connecting element 22 is set to be gradually increased.

Figure 4:
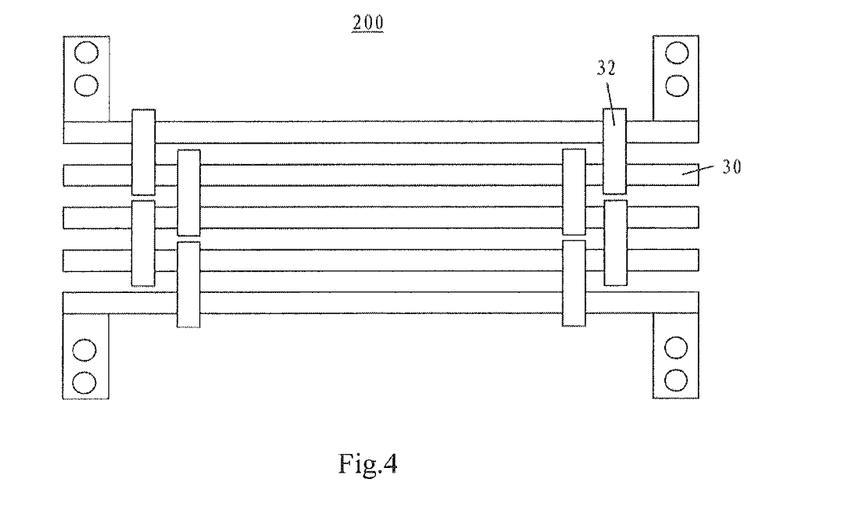
FIG. 4 is a schematic view schematically showing a hinge apparatus according to another exemplary embodiment of the present invention.

The projection 21 and the baffler 23 can not only limit the degree of the rotation angle between the shaft 20 and the connecting element 22, it can also limit the relative positions of the two in the rotation direction, so as to define the shape when the shaft chain is at the two extreme positions of its bending range. For example, when the shaft chain achieves a 360-degree rotation range, preferably, as shown in FIG. 4, the baffler 23 formed on the connecting element 22 is symmetrical with respect to the line O-O' of the centers of the two shaft holes on the connecting element 22. Thus the shaft chain can rotate 180 degrees symmetrically towards both sides from the straight state rotating respectively and thus rotate 360 degrees altogether. This is particularly suitable for hinge apparatus, such as notebook computers, mobile phones and so on. It can be understood that the positions of projection 21 and the baffler 23 can be provided in other ways so as to achieve other desired shapes when the shaft chain is at the two extreme positions of its bending range.

It can be understood that the connecting means between the shaft 20 and the connecting element 22 can also be used in other embodiments described below.

FIG. 4 is a schematic diagram schematically showing the hinge apparatus 200 according to another exemplary embodiment of the present invention. In FIG. 4, portions that are the same with those of the foregoing embodiments are omitted. As shown in the figure, in the hinge apparatus 200, each shaft 30 extends from left to right. For example, it can extend to the width that can be substantially throughout the members (not shown) to be connected, and each two adjacent shafts are connected to each other through the connecting element at least in the vicinity of both ends of the shaft 30. Since the shaft 30 extends to the width that is substantially throughout the members (not shown) to be connected, the hinge apparatus 200 has a good synchronization characteristics. It can be understood that the hinge apparatus 200 of FIG. 4 is similar with that in the case where the maximum number of the simultaneous bridges are set in the hinge apparatus 100.

Figure 5A:
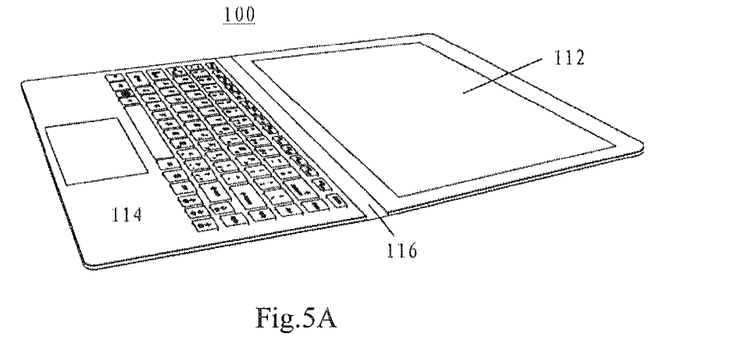
FIGS. 5A, 5B and 5C illustrate various usage states of an electronic device comprising the hinge apparatus according to an embodiment of the present invention.
Figure 5B:
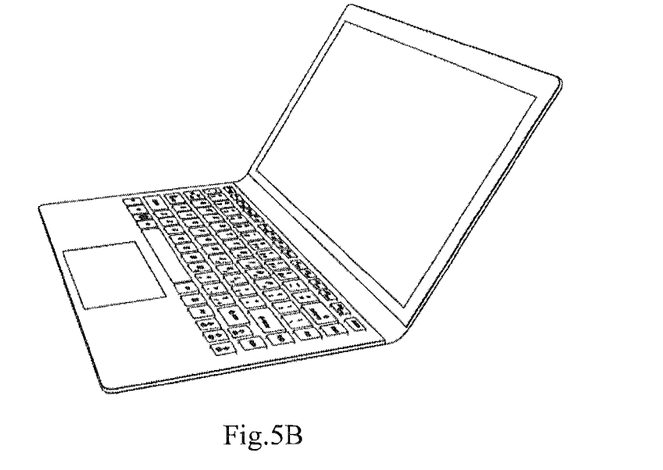
Figure 5C:
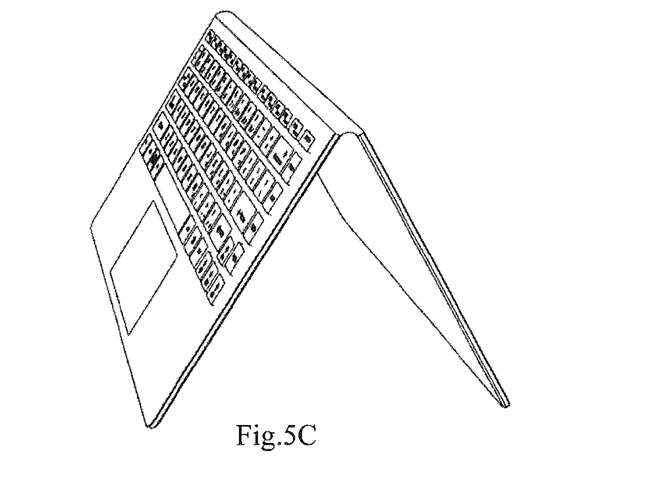
Figure 6A:
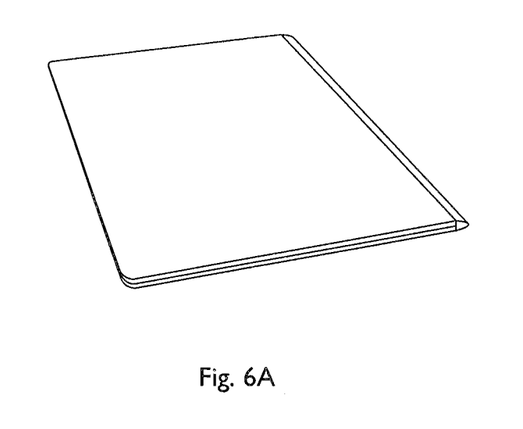
FIG. 6A shows the electronic device of the present invention in a closed state.
Figure 6B:
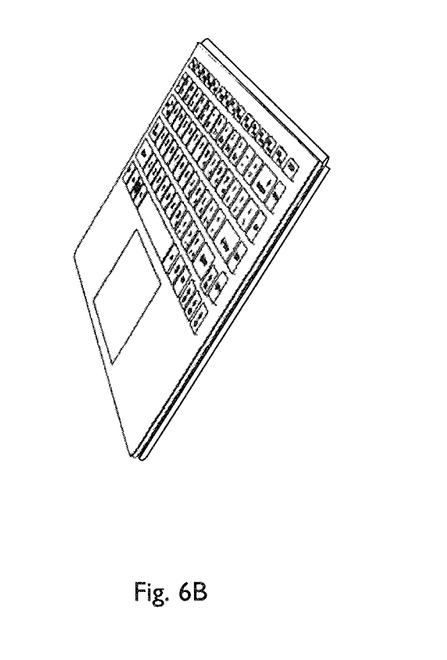
FIG. 6B shows the electronic device of the present invention where the first body and the second body are rotated 360 degrees with respect to each other.

FIGS. 5A, 5B and 5C illustrate the various usage states of the electronic device comprising the hinge apparatus according to an embodiment of the present invention. The electronic device can be, for example, a notebook computer 110. The notebook computer 110 comprises a first body 112, a second body 114, and a hinge apparatus 116 connecting the first body 112 and the second body 114. The hinge apparatus 116 can be a hinge apparatus according to any preceding embodiment or other embodiments of the present invention.

As shown in FIG. 5A, the hinge apparatus 116 can place the first body 112 and the second body 114 in the same plane. In this case, as shown in FIG. 5A, the hinge apparatus 116 and the shaft chain (not shown) comprised in the hinge apparatus 116 can be in a substantially flat state.

The first body 112 can rotate from the position shown in FIG. 5A counterclockwise to the position shown in FIG. 5B through a hinge apparatus 116, in order to provide a conventional computer usage state. Also, the first body 112 can continue to rotate counterclockwise with respect to the second body 114 through the hinge apparatus 116 until rotating 180 degrees, so as to be in a closed state (not shown).

In addition, the first body 112 can also rotate from the position shown in FIG. 5A clockwise to the position shown in FIG. 5C through a hinge apparatus 116. In this case, the second body 114 can be placed on the desktop as a base, and the first body 112 is operated as a pad computer to provide the pad computer, sometimes referred to as ("PAD") usage pattern. It can be understood that the first body 112 can continue to rotate clockwise with respect to the second body 114 through the hinge apparatus 116 until rotating 180 degrees, so that the entire computer can have an appearance the same with a PAD. That is, the first body 112 and the second body 114 can rotate 360 degrees with respect to each other through the hinge apparatus 116.

As described above, an even rotation angle of each shaft can be achieved by providing projections and bafflers (see FIG. 3) in the hinge apparatus 116. The bafflers can be provided symmetrically so that a shape symmetry can be achieved when the hinge apparatus 116 rotates 180 degrees clockwise and counterclockwise As shown in FIGS. 5B and 5C, the electronic device 110 can provide different operating modes based on its different folding forms. For example, it can switch between the conventional computer mode and the PAD mode. In different operating modes, the display interfaces are different and the operating modes are different. For example, in the notebook computer mode, it is operated through a conventional keyboard, while in the PAD mode it is operated through a touch screen. Those skilled in the art can understand that the switching can be achieved through the manual operation of a switch, and it can also be achieved automatically by providing a sensor to detect the folding state of the electronic device 110.

In one embodiment, the first body 112 and the second body 114 have a set of hardware system, and have an operating system installed. The set of hardware system and operating system provide different operating modes, wherein one is a working mode suitable for operating by using a keyboard and a touchpad; the other is a working mode suitable for operating by touching. The user interfaces in the two working modes are different. Each is suitable for its own operating mode respectively and does better than supporting the other operating mode.

In another embodiment, the first body 112 and second body 114 can have one set of hardware system and have two sets of operating systems installed. In different operating modes, the set of hardware system can run in different operating systems. For example, these two operating systems can be WINDOWS system and ANDROID system, APPLE MAC OS system and IOS system, and so on. Different operating systems lead to different user interfaces and operating modes.

In yet another embodiment, the first body 112 and the second body 114 can have different hardware systems and have different operating systems installed. For example, the first body 112 has the ARM hardware system and the operating system based on the ARM hardware system, such as, ANDROID system, IOS and the like. The second body 114 can have the X86 hardware system and the operating system based on the X86 hardware system, such as WINDOWS system, APPLE MAC OS, etc. In the present embodiment, when the operating mode is switched, not only is the operating system switched, but the hardware system is also switched.

Although a number of exemplary embodiments of the present invention are described above, it can be understood that the present invention is not limited to the disclosed exemplary embodiments. Instead, within the spirit and scope of the present invention, those skilled in the art can make various changes in forms and details. The present invention is intended to cover all such modifications and variations. The spirit and scope of the present invention is defined only by the appended claims and their equivalents.

What is claimed is:

1. A hinge apparatus, comprising:
   n shafts, arranged side by side, wherein n is an integer equal to or greater than 3 and each shaft includes a projection;
   multiple connecting elements for rotatably connecting each two adjacent shafts so as to form a shaft chain,
   wherein each connecting element comprises a baffler and at least two shaft holes each shaft hole receiving one of the two adjacent shafts, wherein at least some of the shafts have an end received by more than one connecting element, wherein each projection and each respective baffler cooperate to limit a maximum rotation angle of each shaft with respect to each respective connecting element to a predetermined angle of $180/(n-1)$ degrees.

2. The hinge apparatus according to claim 1, further comprising two or more shaft chains and the hinge apparatus further comprises at least one synchronization bridge extending parallel to the shafts and connecting the shafts which are in adjacent shaft chains respectively, so as to synchronize the rotation of the shafts in the adjacent shaft chains.

3. The hinge apparatus according to claim 1, further comprising a fixed connecting element provided on two outermost shafts of the shaft chain to fixedly connect to external parts to be connected by the hinge.

4. The hinge apparatus according to claim 1, further comprising a soft covering material to cover the shaft chain.

5. An electronic device, comprising a first body, a second body, and a hinge apparatus connecting the first body and the second body, the hinge apparatus comprising:

n shafts, arranged side by side, wherein n is an integer equal to or greater than 3 and each shaft includes a projection;

multiple connecting elements for rotatably connecting each two adjacent shafts so as to form a shaft chain, wherein each connecting element comprises a baffler and at least two shaft holes each shaft hole receiving one of the two adjacent shafts, wherein at least some of the shafts have an end received by more than one connecting element, wherein each projection and each respective baffler cooperate to limit a maximum rotation angle of each shaft with respect to each respective connecting element to a predetermined angle of $180/(n-1)$ degrees.

6. The electronic device according to claim 5, wherein the hinge apparatus further comprises a fixed connecting element provided on two outermost shafts of the shaft chain to fixedly connect to the first body and the second body respectively.

7. The electronic device according to claim 6, wherein the hinge apparatus further comprises a soft covering material to cover the shaft chain and the fixed connecting element between the shaft chain and the first body or the second body, so as to form a seamless connection between the first body and the second body.

8. The electronic device according to claim 5, wherein the first body and the second body rotate 360 degrees with respect to each other through the hinge apparatus.

9. The electronic device according to claim 5, wherein a rotation angle of each shaft with respect to each respective connecting element is different.

* * * * *

UNITED STATES PATENT AND TRADEMARK OFFICE
CERTIFICATE OF CORRECTION

| | | |
|---|---|---|
| PATENT NO. | : 8,713,759 B2 | Page 1 of 1 |
| APPLICATION NO. | : 13/775690 | |
| DATED | : May 6, 2014 | |
| INVENTOR(S) | : Xiao Cai | |

It is certified that error appears in the above-identified patent and that said Letters Patent is hereby corrected as shown below:

On the Title Page

Left column, item (30), after "(CN).................2012 1" replace "0046879" with --0046879.4--.

Signed and Sealed this
Second Day of September, 2014

Michelle K. Lee
*Deputy Director of the United States Patent and Trademark Office*